United States Patent
Di Gennaro et al.

(10) Patent No.: US 6,601,389 B1
(45) Date of Patent: Aug. 5, 2003

(54) LIQUIFIED GAS EVAPORATING DEVICE FOR MARINE ENGINES

(76) Inventors: Antoine Di Gennaro, 386 avenue Marechal Foch, 83000 Toulon (FR); Michel Porta, 20 avenue de la Caravelle l'Aiguade, 83400 Hyeres (FR)

(*) Notice: Subject to any disclaimer, the term of this patent is extended or adjusted under 35 U.S.C. 154(b) by 0 days.

(21) Appl. No.: 09/914,563

(22) PCT Filed: Feb. 29, 2000

(86) PCT No.: PCT/FR00/00496
§ 371 (c)(1),
(2), (4) Date: Aug. 31, 2001

(87) PCT Pub. No.: WO00/52320
PCT Pub. Date: Sep. 8, 2000
(Under 37 CFR 1.47)

(30) Foreign Application Priority Data

Mar. 1, 1999 (FR) .............................................. 99 02720

(51) Int. Cl.[7] .................................................. F03G 7/04
(52) U.S. Cl. ..................................... 60/641.6; 60/641.7
(58) Field of Search ............................ 60/641.1, 641.6, 60/641.7

(56) References Cited

U.S. PATENT DOCUMENTS

| | | | | |
|---|---|---|---|---|
| 3,978,663 A | * | 9/1976 | Mandrin et al. | ............... 60/728 |
| 5,626,019 A | * | 5/1997 | Shimizu et al. | ............... 60/728 |
| 6,089,022 A | * | 7/2000 | Zednik et al. | ............... 60/641.7 |
| 6,164,247 A | * | 12/2000 | Iwasaki et al. | ............ 122/31.1 |

FOREIGN PATENT DOCUMENTS

| | | |
|---|---|---|
| FR | 2757217 | 6/1998 |
| FR | 2759419 | 8/1998 |
| FR | 2764002 | 12/1998 |
| FR | 9808110 | 12/1999 |
| WO | 98/55758 | 12/1998 |

* cited by examiner

*Primary Examiner*—Hoang Nguyen
(74) *Attorney, Agent, or Firm*—Greenblum & Bernstein, P.L.C.

(57) ABSTRACT

A liquefied gas evaporating device supplies liquefied petroleum gas to a marine engine, wherein the device includes a box that includes a heating body incorporating an evaporating chamber and a thermal chamber which are contiguous and separated by a common wall. The thermal chamber hot sea water coming out of a cooling circuit of an engine to flow therethrough via an accelerating pump mounted on an evacuation pipe of the cooling circuit. The heating body is made of a material that resists corrosive action of sea water.

23 Claims, 1 Drawing Sheet

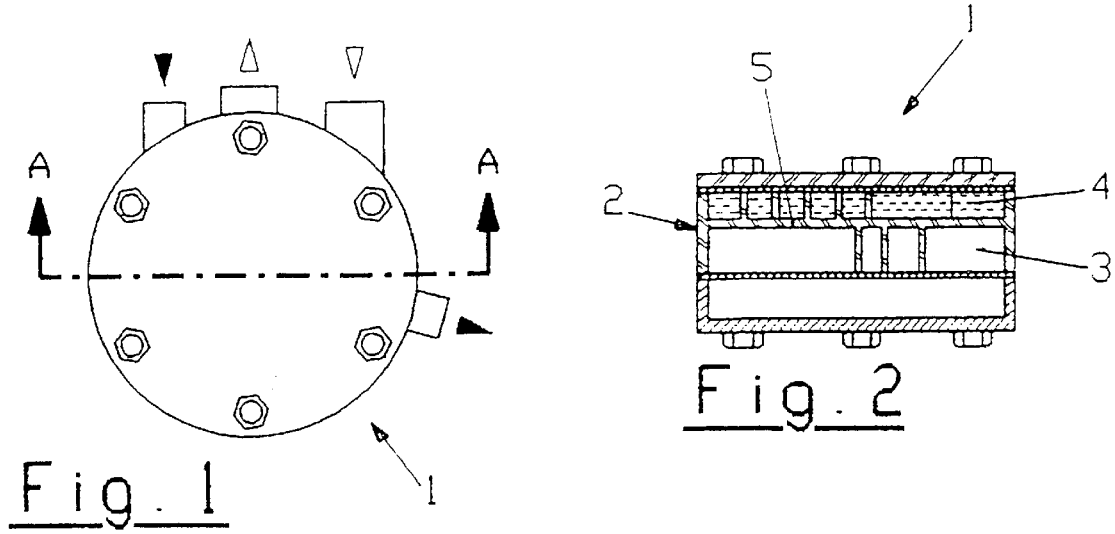
Fig. 1
Fig. 2
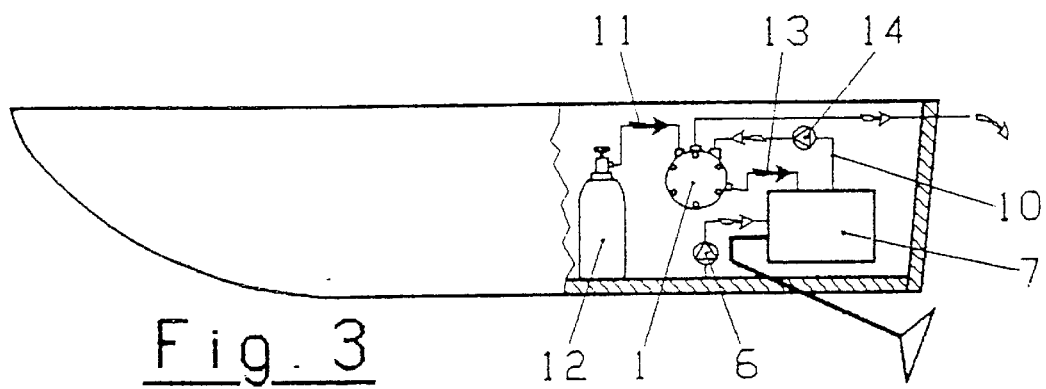
Fig. 3
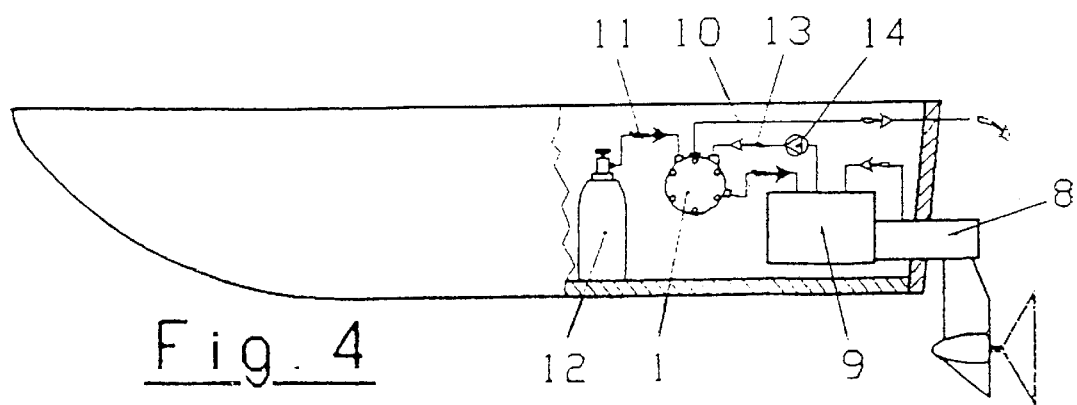
Fig. 4

LIQUIFIED GAS EVAPORATING DEVICE FOR MARINE ENGINES

CROSS-REFERENCE TO RELATED APPLICATIONS

The present application is a National Stage Application of International Application No. PCT/FR00/00496, filed Feb. 29, 2000. Further, the present application claims priority under 35 U.S.C. §119 of French Patent Application No. 99/02720, filed on Mar. 1, 1999.

BACKGROUND OF THE INVENTION

1. Field of the Invention

The present invention relates to a liquefied gas evaporating device for marine engines.

The invention is intended to supply sea water-cooled boat engines with liquefied petroleum gas, whether they are inboard, outboard or Z-drive four-stroke or two-stroke engines with pressurized lubricating circuit; but it is particularly adapted, however, for engines located within the boat.

2. Discussion of Background Information

Liquefied petroleum gas (LPG) is increasingly used as a source of energy for internal combustion engines. Indeed, this fuel has very interesting advantages, chief among them being very low pollution and an advantageous taxation practiced by numerous countries and allowing a substantial reduction in fuel cost.

Using liquefied gas to operate an engine initially designed to receive a liquid fuel requires a special device ensuring the evaporation of the gas under pressure and with a predetermined throughput.

This device is in the form of a box, generally made of light cast metal such as aluminum and comprising a thermal chamber in which circulates a hot liquid generally constituted by the engine cooling water, the box being arranged so as to enable the liquid to transfer to the gas the thermal energy that is necessary for its evaporation.

For sea water-cooled marine engines, it is difficult, even impossible, to use the cooling liquid to directly provide the heat supply necessary for the evaporation of the liquefied gas, sea water having a corrosive action on the constituent materials of the device, the thermal chamber running the risk of rapidly deteriorating the latter, this corrosive action being further increased by the high temperature of the sea water coming out of the engine.

The inventors of the present invention have filed several patent applications related to the heating of liquefied gas vaporizers adapted particularly to boat engines:

- the vaporizer object of the document No. FR 2 757 217 comprises, within the thermal chamber, a container or tubular circuit made of a material which is not subject to the corrosive action of heated sea water, this container or circuit being connected to the cooling water intake or outlet, the thermal chamber being filled with a substance in liquid or paste form which is a good heat conductor capable of transmitting the thermal energy to the evaporation chamber.
- The document No. 2 759 419 discloses a vaporizer equipped with a heating element constituted of an electrical resistance connected to the electric circuit of the engine or to an external source.
- The International Patent No. WO 98/55 758 describes an evaporation housing whose temperature chamber is branch-connected, by a double conduit, to the engine lubricating circuit.
- The Patent Application No. FR 98 08 110 relates to a system comprising a sealed enclosure provided with a heat supply element and connected to the thermal chamber of the liquefied gas evaporating box by a double channel to form a closed circuit in which circulates, due to a pump, a fluid transferring heat from the heated enclosure to the vaporizer.

While these devices solve certain problems posed by the evaporation of liquefied gas, they have a certain number of disadvantages. The first one cited does not allow a good heat transfer between the hot liquid and the evaporating chamber. The use of an electrical resistance arranged in the thermal chamber of the vaporizer makes it difficult to produce a sufficient quantity of energy with a standard evaporating box and, to function properly, requires using an oversized apparatus. The device using the engine lubricating fluid cannot be used for a two-stroke engine and involves risks of leakage from the lubricating system. Finally, the use of a separate enclosure results in a cumbersome and expensive installation.

The device according to the present invention attempts to remedy these disadvantages. Indeed, it makes it possible to obtain vaporizers at a manufacturing cost which is substantially equal to that of the devices used in land vehicles, which can be used under excellent conditions in see water-cooled marine engines and ensure a very good heat exchange between the cooling liquid and the gas to be vaporized.

SUMMARY OF THE INVENTION

The invention therefore provides a liquefied gas evaporating box comprising an element in which circulates the water which has been used to cool the engine, this element being made of a sea water resistant material such as brass or bronze and supplied by the engine cooling water by way of a pump located on the exhaust system.

The invention provides a liquefied gas evaporating device for marine engines, making it possible to supply sea water-cooled boat engines with liquefied petroleum gas, whether they are inboard, Z-drive or outboard four-stroke or two-stroke engines with pressurized lubrication circuit. This device is constituted of a box comprising a heating body incorporating an evaporating chamber and a thermal chamber which are contiguous and separated by a common wall, characterized in that the thermal chamber allows therethrough the hot sea water coming out of the cooling circuit of the engine due to an accelerating pump mounted on the evacuation pipe of the cooling circuit, between the engine and the thermal chamber. The heating body is made of a material resisting the corrosive action of the sea water.

The heating body can be made of bronze or brass, and can be identical to that of the known vaporizers made of aluminum casting and made with the tools used for the latter. The heating body can also be made of synthetic resin. The synthetic resin used for manufacturing the heating body can be loaded with metallic particles or fibers so as to improve the thermal conductivity.

The evaporating box can be located on board the boat to supply an outboard engine, with the thermal chamber being connected to the cooling circuit by a single flexible pipe, the discharge going directly into the sea.

The evaporating box can be located on board the boat to supply an outboard engine, with the thermal chamber being connected to the cooling circuit by a double flexible pipe constituting a branch conduit for evacuating the engine cooling water.

The invention also provides for a liquefied gas evaporating device for supplying liquefied petroleum gas to a marine engine, comprising a box that includes a heating body incorporating an evaporating chamber and a thermal chamber which are contiguous and separated by a common wall. The thermal chamber allows therethrough hot sea water coming out of a cooling circuit of an engine via an accelerating pump mounted on an evacuation pipe of said cooling circuit, between said engine and said thermal chamber. The heating body is made of a material that resists corrosive action of sea water.

The marine engine may comprise one of inboard engine, a Z-drive engine, a four-stroke engine, an outboard engine, a two-stroke engine, and an engine with a pressurized lubrication circuit. The heating body may be made of one of bronze and brass. The heating body may be made of an aluminum casting. The heating body may be made of synthetic resin. The synthetic resin may be loaded with one of metallic particles and fibers which can improve a thermal conductivity of the synthetic resin. The heating body may comprise a synthetic resin which includes one of metallic particles and fibers.

The device may be mounted to a boat and coupled to an outboard engine, the thermal chamber may be connected to the cooling circuit by a single flexible pipe, and a discharge may be provided to direct sea water directly into the sea.

The device may be mounted to a boat and coupled to an outboard engine, the thermal chamber may be connected to the cooling circuit by a double flexible pipe that includes a branch conduit for evacuating engine cooling water.

The invention also provides for a system for supplying liquefied petroleum gas to a marine engine, comprising a heating body that includes an evaporating chamber and a thermal chamber. A wall is common to the evaporating chamber and the thermal chamber. The thermal chamber has an inlet which receives hot water from a cooling circuit of an engine and an outlet which discharges the hot water. The evaporating chamber has an inlet which receives gas from a supply reservoir and an outlet which is coupled to the marine engine. A pump is mounted on an evacuation pipe of the cooling circuit, the pump delivering the hot water to the inlet. The heating body is made of a material that resists corrosive action of the hot water.

The marine engine may comprise one of an inboard engine, a Z-drive engine, a four-stroke engine, an outboard engine, a two-stroke engine, and an engine with a pressurized lubrication circuit.

The heating body may be made of one of bronze and brass. The heating body may be made of an aluminum casting. The heating body may be made of synthetic resin. The synthetic resin may be loaded with one of metallic particles and fibers which can improve a thermal conductivity of the synthetic resin. The heating body may comprise a synthetic resin which includes one of metallic particles and fibers.

The invention also provides for a system for supplying liquefied petroleum gas to a marine engine, comprising a heating body that includes an evaporating chamber and a thermal chamber. A wall is common to the evaporating chamber and the thermal chamber. The thermal chamber has an outlet and an inlet which receives marine water. The marine water is taken from a marine environment, heated by the marine engine and delivered to the outlet of the thermal chamber. The evaporating chamber has an inlet which receives gas from a supply reservoir and an outlet which is coupled to the marine engine. A pump delivers the marine water to the inlet of the thermal chamber. A discharge conduit removes the marine water from the outlet of the thermal chamber to the marine environment. The heating body is made of a material that resists corrosive action of the marine water.

BRIEF DESCRIPTION OF THE DRAWINGS

The annexed drawings, provide by way of non-limiting examples, embodiments of the invention, wherein:

FIG. 1 shows a top view of an evaporating box;

FIG. 2 is a transverse cross-section along the sections A—A of FIG. 1; and

FIGS. 3 and 4 schematically show the method of installing the system, for an inboard engine and a Z-drive engine, respectively.

DETAILED DESCRIPTION OF THE INVENTION

The liquefied petroleum gas vaporizers are constituted of a box 1 comprising a heating body 2 incorporating an evaporating chamber 3 and a thermal chamber 4 which are contiguous and separated by a common wall 5.

For the sea water-cooled boat engines, this water comes from a pump 6 generally installed on board, in the case of an inboard type internal engine 7, or in the gear box 8 in the case of a Z-drive type engine 9. After passing through the engine, the water is discharged into the sea by an evacuation pipe 10. In an outboard engine (not shown), the sea water is drawn by an integrated pump and discharged directly by the exhaust pipe.

The heating body 2 of the vaporizer according to the invention containing the evaporating chamber 3 and the thermal chamber 4 is made out of a material resisting the sea water corrosive action. This material is preferably constituted of brass or bronze making it possible to manufacture a heating body identical to that of the known vaporizers made of aluminum casting with the tools used for the latter. The material used can also be a synthetic resin possibly loaded with metallic fibers or particles to improve the thermal conductivity.

The evaporating chamber 3 is connected to a gas intake 11 connected to the supply reservoir 12 and, furthermore, to a gas outlet 13 connected to engine 7, 9.

The claimed vaporizer is branch-mounted on the evacuation pipe 10 of the cooling circuit of the engine 7, 9 so that the water heated by the engine flows through the thermal chamber 4. An accelerating pump 14 is advantageously mounted on the evacuation pipe, between the engine 7, 9 and the thermal chamber of the vaporizer. In the case of an outboard-type engine, the vaporizer is preferably onboard, the thermal chamber being connected to the cooling circuit by a single flexible pipe, the discharge going directly into the sea, or by a double flexible pipe constituting a branch conduit for evacuating the engine cooling water.

The positioning of the various constituent elements provides one object of the invention with a maximum of useful effects which had not, to date, been obtained by similar devices.

What is claimed is:

1. Liquefied gas evaporating device for marine engines, making it possible to supply sea water-cooled boat engines with liquefied petroleum gas (LPG), whether they are inboard, Z-drive or outboard four-stroke or two-stroke engines with pressurized lubrication circuit, this device being constituted of a box (1) comprising a heating body (2)

incorporating an evaporating chamber (3) and a thermal chamber (4) which are contiguous and separated by a common wall (5), characterized in that the thermal chamber (4) allows therethrough the hot sea water coming out of the cooling circuit of the engine (7, 9) due to an accelerating pump (14) mounted on the evacuation pipe (10) of said cooling circuit, between said engine and said thermal chamber, the heating body (2) being made of a material resisting the corrosive action of the sea water.

2. Device according to claim 1, characterized in that the heating body (2) is made of bronze or brass, and is identical to that of the known vaporizers made of aluminum casting and made with the tools used for the latter.

3. Device according to claim 1, characterized in that the heating body (2) is made of synthetic resin.

4. Device according to claim 3, characterized in that the synthetic resin used for manufacturing the heating body (2) is loaded with metallic particles or fibers so as to improve the thermal conductivity.

5. Device according to claim 1 using an evaporating box (2) located on board the boat to supply an outboard engine, characterized in that the thermal chamber (4) is connected to the cooling circuit by a single flexible pipe, the discharge going directly into the sea.

6. Device according to claim 1 using an evaporating box (2) located on board the boat to supply an outboard engine, characterized in that the thermal chamber (4) is connected to the cooling circuit by a double flexible pipe constituting a branch conduit for evacuating the engine cooling water.

7. A liquefied gas evaporating device for supplying liquefied petroleum gas to a marine engine, comprising:

a heating body incorporating an evaporating chamber and a thermal chamber;

the evaporating chamber and the thermal chamber being contiguous and being separated by a common wall;

the thermal chamber allowing hot sea water to flow therethrough;

the hot sea water being pumped from a cooling circuit of the marine engine via an accelerating pump mounted on an evacuation pipe of the cooling circuit; and the heating body being made of a material that resists corrosive action of sea water.

8. The device of claim 7, wherein the marine engine comprises one of:

inboard engine;

a Z-drive engine;

a four-stroke engine;

an outboard engine;

a two-stroke engine; and an engine with a pressurized lubrication circuit.

9. The device of claim 7, wherein the heating body is made of one of bronze and brass.

10. The device of claim 7, wherein the heating body is made of an aluminum casting.

11. The device of claim 7, wherein the heating body is made of synthetic resin.

12. The device of claim 11, wherein the synthetic resin is loaded with one of metallic particles and fibers which can improve a thermal conductivity of the synthetic resin.

13. The device of claim 7, wherein the heating body comprises a synthetic resin which includes one of metallic particles and fibers.

14. The device of claim 7, wherein the device is mounted to a boat and coupled to an outboard engine, wherein the thermal chamber is connected to the cooling circuit by a single flexible pipe, and wherein a discharge is provided to direct sea water directly into the sea.

15. The device of claim 7, wherein the device is mounted to a boat and coupled to an outboard engine, wherein the thermal chamber is connected to the cooling circuit by a double flexible pipe that includes a branch conduit for evacuating engine cooling water.

16. A system for supplying liquefied petroleum gas to a marine engine, comprising:

a heating body that includes an evaporating chamber and a thermal chamber;

a wall that is common to the evaporating chamber and the thermal chamber;

the thermal chamber having an inlet which receives hot water from a cooling circuit of an engine and an outlet which discharges the hot water;

the evaporating chamber having an inlet which receives gas from a supply reservoir and an outlet which is coupled to the marine engine;

a pump mounted on an evacuation pipe of the cooling circuit, the pump delivering the hot water to the inlet; and the heating body being made of a material that resists corrosive action of the hot water.

17. The system of claim 16, wherein the marine engine comprises one of:

an inboard engine;

a Z-drive engine;

a four-stroke engine;

an outboard engine;

a two-stroke engine; and an engine with a pressurized lubrication circuit.

18. The device of claim 16, wherein the heating body is made of one of bronze and brass.

19. The device of claim 16, wherein the heating body is made of an aluminum casting.

20. The device of claim 16, wherein the heating body is made of synthetic resin.

21. The device of claim 20, wherein the synthetic resin is loaded with one of metallic particles and fibers which can improve a thermal conductivity of the synthetic resin.

22. The device of claim 16, wherein the heating body comprises a synthetic resin which includes one of metallic particles and fibers.

23. A system for supplying liquefied petroleum gas to a marine engine, comprising:

a heating body that includes an evaporating chamber and a thermal chamber;

a wall that is common to the evaporating chamber and the thermal chamber;

the thermal chamber having an outlet and an inlet which receives marine water;

the marine water being taken from a marine environment, heated by the marine engine and delivered to the outlet of the thermal chamber;

the evaporating chamber having an inlet which receives gas from a supply reservoir and an outlet which is coupled to the marine engine;

a pump that delivers the marine water to the inlet of the thermal chamber; and a discharge conduit that removes the marine water from the outlet of the thermal chamber to the marine environment, wherein the heating body is made of a material that resists corrosive action of the marine water.

* * * * *